United States Patent
Reed et al.

(10) Patent No.: US 12,478,261 B2
(45) Date of Patent: Nov. 25, 2025

(54) MULTIPLEXED IMPLANTABLE SENSOR PROBE

(71) Applicant: Yale University, New Haven, CT (US)

(72) Inventors: Mark Reed, Monroe, CT (US); Dennis Spencer, Woodbridge, CT (US); Hitten Zaveri, New Haven, CT (US)

(73) Assignee: Yale University, New Haven, CT (US)

( * ) Notice: Subject to any disclaimer, the term of this patent is extended or adjusted under 35 U.S.C. 154(b) by 0 days.

(21) Appl. No.: 15/975,067

(22) Filed: May 9, 2018

(65) Prior Publication Data

US 2018/0325386 A1    Nov. 15, 2018

Related U.S. Application Data

(60) Provisional application No. 62/503,744, filed on May 9, 2017.

(51) Int. Cl.
*A61B 5/0205* (2006.01)
*A61B 5/00* (2006.01)
(Continued)

(52) U.S. Cl.
CPC .......... *A61B 5/0205* (2013.01); *A61B 5/031* (2013.01); *A61B 5/14542* (2013.01); *A61B 5/1473* (2013.01); *A61B 5/293* (2021.01); *A61B 5/4064* (2013.01); *A61B 5/6868* (2013.01); *G01L 19/0092* (2013.01); *G01N 27/404* (2013.01); *G01N 27/4145* (2013.01); *A61B 5/0022* (2013.01); *A61B 5/01* (2013.01);
(Continued)

(58) Field of Classification Search
CPC ... A61B 5/0205; A61B 5/1473; A61B 5/4064; A61B 5/6868; A61B 5/04001; A61B 5/14542; A61B 5/031; A61B 5/0478; A61B 5/01; A61B 5/0022; A61B 5/1495; A61B 5/6852; A61B 5/026; A61B 2562/028; A61B 2562/227; A61B 2562/063; A61B 5/293; G01N 27/4145; G01N 27/404; G01N 27/4146; G01L 19/0092
USPC ................................. 600/300, 301, 483, 513
See application file for complete search history.

(56) References Cited

U.S. PATENT DOCUMENTS 5,763,775 A * 6/1998 Sato ...................... G01F 1/6845
                                                73/204.26
6,615,655 B1 * 9/2003 Sakai ..................... G01F 1/6845
                                                73/204.26
(Continued)

OTHER PUBLICATIONS

Bowden, N., Brittain, S., Evans, A. et al. Spontaneous formation of ordered structures in thin films of metals supported on an elastomeric polymer. Nature 393, 146-149 (1998) doi:10.1038/30193 (Year: 1998).*

(Continued)

*Primary Examiner* — Carl H Layno
*Assistant Examiner* — Aya Ziad Bakkar
(74) *Attorney, Agent, or Firm* — Riverside Law LLP

(57) ABSTRACT

The present invention provides devices comprising multimodal depth electrodes for real-time quantification of chemistry and electrophysiology of the body. The devices are useful in several applications, including monitoring primary and secondary brain injury. The multimodal depth electrodes electrically transduce signals from biological parameters of interest, including EEG, temperature, pressure, oxygen level, blood flow, and chemistry.

25 Claims, 12 Drawing Sheets

(51) Int. Cl.
*A61B 5/026* (2006.01)
*A61B 5/03* (2006.01)
*A61B 5/145* (2006.01)
*A61B 5/1473* (2006.01)
*A61B 5/1495* (2006.01)
*A61B 5/293* (2021.01)
*G01L 19/00* (2006.01)
*G01N 27/404* (2006.01)
*G01N 27/414* (2006.01)
*A61B 5/01* (2006.01)

(52) U.S. Cl.
CPC ............ *A61B 5/026* (2013.01); *A61B 5/1495* (2013.01); *A61B 5/6852* (2013.01); *A61B 2562/028* (2013.01); *A61B 2562/063* (2013.01); *A61B 2562/227* (2013.01); *G01N 27/4146* (2013.01)

(56) References Cited

U.S. PATENT DOCUMENTS

| | | | | |
|---|---|---|---|---|
| 8,069,718 | B2* | 12/2011 | Nakano | G01F 1/692 73/204.26 |
| 2006/0220662 | A1* | 10/2006 | Nakano | G01P 15/008 324/693 |
| 2008/0015268 | A1* | 1/2008 | Wudl | B82Y 30/00 521/27 |
| 2008/0033400 | A1* | 2/2008 | Holper | A61M 1/0023 604/541 |
| 2009/0074669 | A1* | 3/2009 | Ebert | A01K 67/0275 424/9.3 |
| 2009/0282192 | A1* | 11/2009 | Maus | G06Q 20/105 711/115 |
| 2010/0168532 | A1* | 7/2010 | Waziri | A61B 5/14542 600/301 |
| 2011/0066072 | A1* | 3/2011 | Kawoos | A61B 5/031 600/561 |
| 2012/0035583 | A1* | 2/2012 | Sepkuty | A61B 5/6849 607/113 |
| 2013/0237955 | A1* | 9/2013 | Neta | A61M 5/16831 604/113 |
| 2013/0316487 | A1* | 11/2013 | de Graff | A61B 1/04 438/66 |
| 2013/0317388 | A1* | 11/2013 | Bieberich | G01K 1/165 600/549 |
| 2014/0066765 | A1* | 3/2014 | Fan | A61B 8/0891 600/407 |
| 2014/0276138 | A1* | 9/2014 | Millett | A61B 5/6851 600/585 |
| 2016/0082179 | A1* | 3/2016 | Toth | A61B 18/1492 604/20 |
| 2016/0082197 | A1* | 3/2016 | Giambattista | A61M 5/31551 604/211 |
| 2016/0113518 | A1* | 4/2016 | Narayan | A61B 5/01 600/504 |
| 2016/0135749 | A1* | 5/2016 | Chan | A61B 5/0031 600/301 |
| 2016/0302682 | A1* | 10/2016 | Lieber | A61B 5/283 |

OTHER PUBLICATIONS

Jobst, G., et al. "Thin-film Clark-type oxygen sensor based on novel polymer membrane systems for in vivo and biosensor applications." Biosensors and Bioelectronics 8.3-4 (1993): (Year: 1993).*

Fang, X., Zhang, H., Zhang, F., Jing, F., Mao, H., Jin, Q., & Zhao, J. (2012). Real-time monitoring of strand-displacement DNA amplification by a contactless electrochemical microsystem using interdigitated electrodes. Lab on a Chip, 12(17), 3190-3196. (Year: 2012).*

Fang, X., Jin, Q., Jing, F., Zhang, H., Zhang, F., Mao, H., . . . & Zhao, J. (2013). Integrated biochip for label-free and real-time detection of DNA amplification by contactless impedance measurements based on interdigitated electrodes. Biosensors and Bioelectronics, 44, 241-247 (Year: 2013).*

Wu, Z., Li, C., Hartings, J., Narayan, R. K., & Ahn, C. (Aug. 2016). Polysilicon based flexible temperature sensor for high spatial resolution brain temperature monitoring. In 2016 38th Annual International Conference of the IEEE Engineering in Medicine and Biology Society (EMBC) (pp. 6497-6500). (Year: 2016).*

"Ned Bowden et al., Spontaneous formation of ordered structures in thin films of metals supported on an elastomeric polymer, May 14, 1998, letters to Nature" (Year: 1998).*

"G. Jobst et al., Thin-film Clark-type oxygen sensor based on novel polymer membrane systems for in vivo and biosensor applications, May 1992, Elsevier Science Publishers Ltd." (Year: 1992).*

* cited by examiner

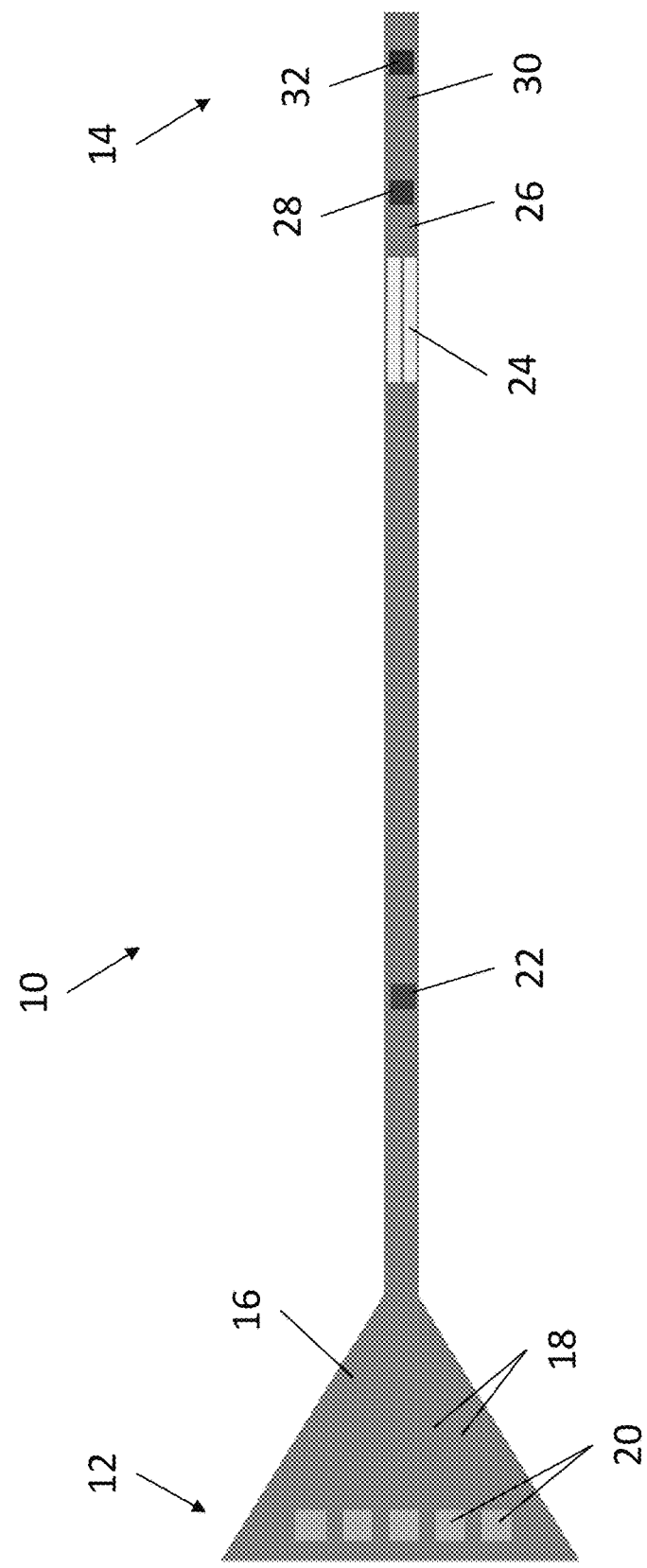
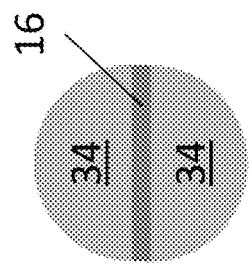
Figure 1C
Figure 1B
Figure 1A

MULTIPLEXED IMPLANTABLE SENSOR PROBE

CROSS-REFERENCE TO RELATED APPLICATIONS

This application claims priority to U.S. Provisional Patent Application No. 62/503,744 filed May 9, 2017, the contents of which are incorporated by reference herein in its entirety.

BACKGROUND OF THE INVENTION

Moderate to severe traumatic brain injury (TBI) is a critical public health and socio-economic problem worldwide. It is a major cause of mortality among young adults and lifelong disability for its survivors. There are more than 5 million people in the US with TBI related disability, and the incidence of TBI worldwide is rising. TBI pathophysiology is divided into two phases: the initial neuronal injury (or primary injury) followed by secondary injury. In caring for severely brain injured patients, being able to minimize secondary injury is crucial.

Multimodality monitoring allows neurointensivists the ability to monitor multiple physiologic parameters simultaneously, which provides critical insight into brain ischemia, hypoxia, and seizures, the major drivers of secondary injury. The management of severe TBI in the neuro-intensive care unit is moving away from a pure "threshold-based" treatment approach toward consideration of patient specific characteristics. Multimodality cerebral monitoring is critical to understanding patient specific characteristics, thus allowing one to tailor interventions on an individualized level.

Current approaches to TBI monitoring employ multiple invasive probes. Multiple separate devices cause a number of challenges, including increased risk of infection from multiple entry points, multiple electronic units from different vendors with different software systems, and different IT and biomedical engineering staff training requirements.

In the event of acute brain injury, the primary brain injury event has occurred and the focus of care delivery shifts to preventing secondary brain injury. In the setting of TBI, secondary brain injury can occur in the setting of a variety of physiologic perturbations (e.g. fever, elevated ICP, seizures, local hematoma compression, evolving cerebral edema, hypotension, hypoxia, hyper/hypo-glycemia, hyper/hypo-carbia) (Vespa P M et al., Crit Care Med, 2007, 35(12):2830-6; Vespa P M et al., J Cereb Blood Flow Metab, 2003, 23(7):865-77; Sykora M et al., Crit Care Med, 2016, 44(6):1173-81; Stein N R et al., Neurocrit Care, 2012, 17(1):49-57; Spiotta A M et al., J Neurosurg, 2010, 113(3): 571-80; Paraforou T et al., BMC Res Notes, 2011, 4:540; Marcoux J et al., Crit Care Med, 2008, 36(10):2871-7; Maloney-Wilensky E et al., Crit Care Med, 2009, 37(6): 2057-63). The burden of secondary injury has a direct impact on outcome and recovery (Stein N R et al., Neurocrit Care, 2012, 17(1):49-57; Spiotta A M et al., J Neurosurg, 2010, 113(3):571-80; Marcoux J et al., Crit Care Med, 2008, 36(10):2871-7; Maloney-Wilensky E et al., Crit Care Med, 2009, 37(6):2057-63; Timofeev I et al., Brain, 2011, 134(Pt 2):484-94). In the severely injured brain, the clinical examination and systemic physiologic measures (HR, SpO2, SBP and MAP) are insufficient to detect secondary brain injury and advanced invasive neuromonitoring is required. To date, ICP monitoring has been the cornerstone of modern neuro-critical care and is used as a marker of secondary brain injury (Lu C W et al., Acta Neurochir Suppl, 2016, 122:33-5; Le Roux P, Curr Opin Crit Care, 2014, 20(2):141-7). In the injured brain, normal autoregulatory mechanisms to maintain adequate cerebral blood flow in the face of changing physiology are disrupted, such that the blood supply is inadequate to meet the individual brain's metabolic requirements (supply-demand mismatch). Supply-demand mismatch is common in patients with TBI (Lazaridis C et al., Neurosurg Clin N Am, 2016, 27(4):509-17). To address supply-demand mismatch, multimodal probes placed in at-risk tissue help determine individualized therapeutic targets to maintain adequate tissue supply (Makarenko S et al., J Clin Neurosci, 2016, 26:8-13).

Little has changed in how brain injured patients are monitored to assess the current extent of primary brain injury and prognosticate. In the last few years, specialized NICUs have evolved to focus on the management of secondary brain injury, which often leads to neurologic deterioration and worse outcome in patients with acute brain injury, particularly traumatic brain injury. Though integrated probes have been described in research efforts, none have been developed as a simple comprehensive solution and brought to bear on clinical care (Li C et al., Biomed Microdevices, 2015, 17(5):87; Li C et al., IEEE International Electron Devices Meeting (IEDM), 2014).

There is a need in the art for improved probe devices for real-time monitoring of traumatic brain injury. The present invention meets this need.

SUMMARY OF THE INVENTION

In one aspect, the present invention relates a probe device comprising: an elongate body having a proximal end comprising one or more connector pads, and a distal end comprising at least one EEG electrode, at least one oxygen sensor, at least one pressure sensor, and at least one flow sensor, wherein each of the sensors is connected to a connector pad by one or more leads.

In one embodiment, the at least one EEG electrode comprises a thin film metal evaporated onto a flexible polymer strip. In one embodiment, the thin film metal is gold or platinum. In one embodiment, the at least one EEG electrode comprises a metal cuff attached to an exterior of the probe device.

In one embodiment, the at least one oxygen sensor is a Clark-type sensor comprising thin-film electrode leads overlaid with a solid-state proton conductive matrix (PCM). In one embodiment, the at least one oxygen sensor comprises a titanium/gold or titanium/platinum electrodes overlaid with a PCM constructed from Nafion. In one embodiment, a layer of polydimethylsiloxane (PDMS) overlays the PCM.

In one embodiment, the at least one pressure sensor is selected from a microelectromechanical sensor (MEMS), a capacitive pressure sensor, and a piezoresistive pressure sensor. In one embodiment, the at least one pressure sensor is electronically connected to a valve positioned within a lumen of the elongate body, such that the at least one pressure sensor is configured to open the valve above a preset pressure threshold and to close the valve below a preset pressure threshold.

In one embodiment, the one or more sensors comprise at least one flow sensor. In one embodiment, the at least one flow sensor comprises a flow sensor thermometer and a flow sensor heater. In one embodiment, the at least one flow sensor heater comprises a thin film NiCr or Au resistor. In one embodiment, the at least one flow sensor thermometer comprises a thin film NiCr or Au thermistor. In one embodiment, the at least one flow sensor thermometer is a silicon diode. In one embodiment, the at least one flow sensor comprises a heater adjacent to a thermistor fabricated as a single component. In one embodiment, the at least one flow sensor heater and the at least one flow sensor thermometer are integrated onto a single substrate.

In one embodiment, the device further comprises one or more preamps positioned on the one or more leads between the connector pads and the sensors. In one embodiment, the device further comprises at least one local field potential electrode.

In one embodiment, the device further comprises at least one field effect transistor (FET) sensor, enzyme FET (ENFET) sensor, or nanowire field-effect transistors (NWFET). In one embodiment, the at least one FET sensor, ENFET sensor, or NWFET sensor is configured to detect a biomarker selected from the group consisting of: lactate, pyruvate, glutamate, glutamine, and glycerol.

In one embodiment, the elongate body is coated in a layer of polytetrafluoroethelene (PTFE) or polydimethylsiloxane (PDMS).

In one embodiment, the device further comprises an interface device electronically connected to the one or more connector pads, the interface device comprising non-transitory computer-readable media configured to capture readings from the device sensors and a processor configured to interpret readings from the device sensors. In one embodiment, the interface device further comprises non-transitory computer-readable media having calibration data for the device sensors. In one embodiment, the interface device is configured to connect to one or more external displays in a wired or wireless connection.

BRIEF DESCRIPTION OF THE DRAWINGS

The following detailed description of embodiments of the invention will be better understood when read in conjunction with the appended drawings. It should be understood, however, that the invention is not limited to the precise arrangements and instrumentalities of the embodiments shown in the drawings.

FIG. 1A through FIG. 1C are schematics of an exemplary probe device. FIG. 1A depicts an exemplary top-down layout of sensors, electrodes, and leads. FIG. 1B depicts an exemplary front cross-sectional view of the probe body with the layer of sensors, electrodes, and leads on top. FIG. 1C depicts an exemplary front cross-sectional view of the probe body showing a circular cross-section with the layer of sensors, electrodes, and leads sandwiched within a cylindrical body.

DETAILED DESCRIPTION

Figure 2:
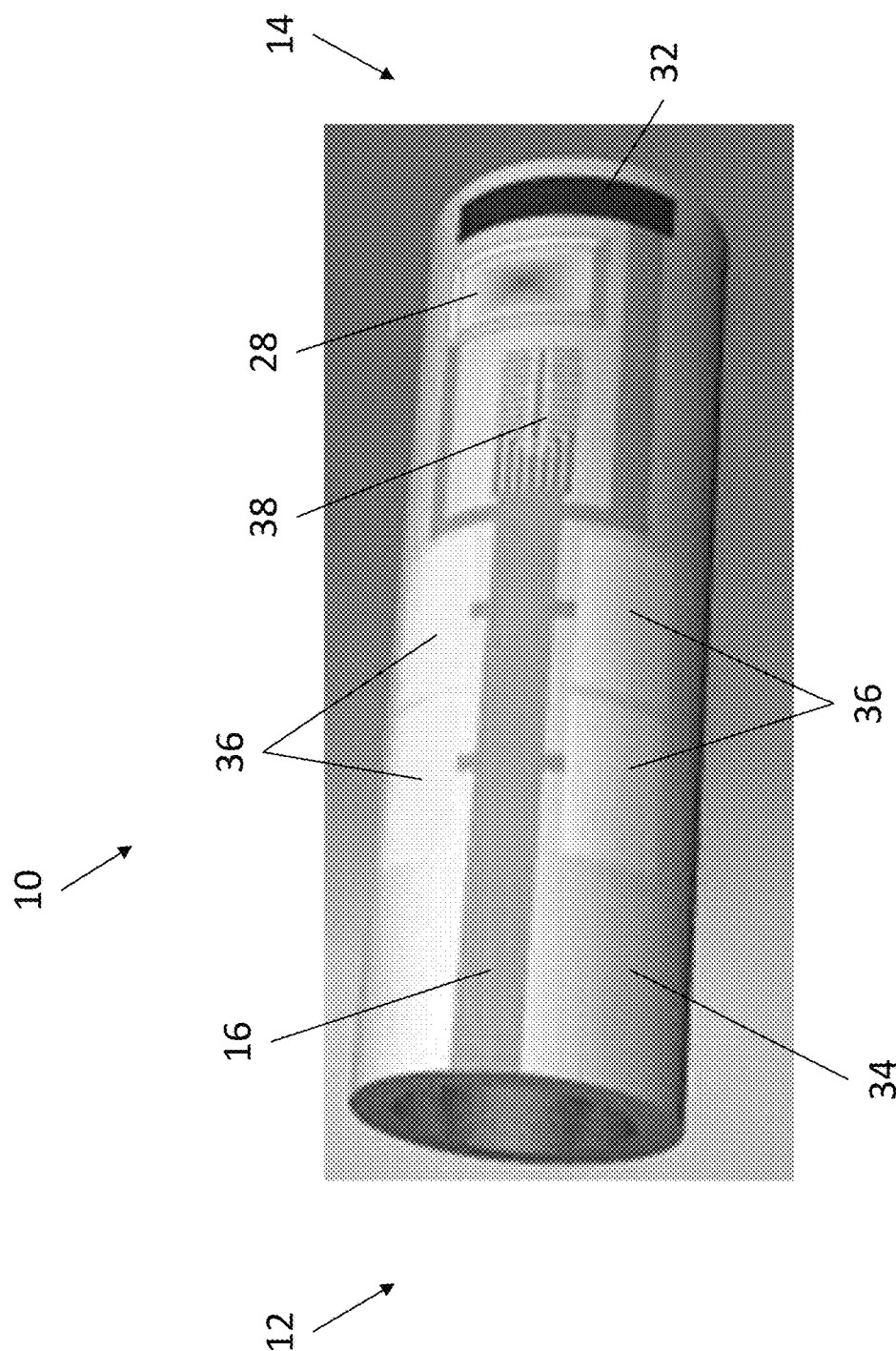
FIG. 2 is a perspective view of another exemplary probe device having sensors, electrodes, and leads placed on a hollow tubular probe body.

The present invention provides devices comprising multimodal depth electrodes for real-time quantification of chemistry and electrophysiology of the body. The devices are useful in several applications, including monitoring primary and secondary brain injury. The multimodal depth electrodes electrically transduce signals from biological parameters of interest, including EEG, temperature, pressure, oxygen level, blood flow, concentration of a biomarker, and chemistry.

Definitions

It is to be understood that the figures and descriptions of the present invention have been simplified to illustrate elements that are relevant for a clear understanding of the present invention, while eliminating, for the purpose of clarity, many other elements typically found in the art. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined elsewhere, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6, and any whole and partial increments there between. This applies regardless of the breadth of the range.

Multiplexed Probe Device

The present invention relates to a brain implantable electronic multi-sensor device with an array of multimodal sensors for rapid, sensitive, co-localized, in vivo measurement of brain physiology for brain injury. The probe device contains an array of sensors that electrically transduce signals from the following biological parameters of interest: intracranial EEG (ICEEG), intracranial temperature (ICT), intracranial pressure (ICP), brain tissue oxygen ($P_{BT}O_2$), and cerebral blood flow (CBF). The ICEEG, ICT, ICP, $P_{BT}O_2$, and CBF sensors are co-localized on the probe device and the resultant single probe replaces several commercially available probes. The probe device interfaces with an external interface device. Each probe device has incorporated (at the connector end) an EEPROM (e.g., SII S-24C16C) containing calibration data. This data is read by the interface device to translate the sensor reading into calibrated data. The interface device allows conduction of the multi-modal sensor data acquired by the probe device in a single multiplexed data stream to NICU monitors (e.g., Phillips, G.E.), multi-modal data aggregator and display equipment (e.g., Moberg, Persyst), as well as standard tablets and smartphones. The invention also relates to a system comprising a probe device, an interface device, and a display device configured to visualize data. The present invention allows collection of multi-modal data with a single probe and a single interface device as opposed to multiple probes and multiple interface devices. The devices of the invention allows for reduced cost, reduced risk to the patient, co-localized measurement of brain activity, and a single integrated stream of multi-modal sensor data. The devices can be placed at the bedside and can be used without an OR procedure. Further, the ability to flexibly interface with multiple output devices including standard tablets and smartphones allows a simple single end-to-end solution from sensors to display of multi-modal data from a single solution in an otherwise fragmented and complex domain.

Figure 3:
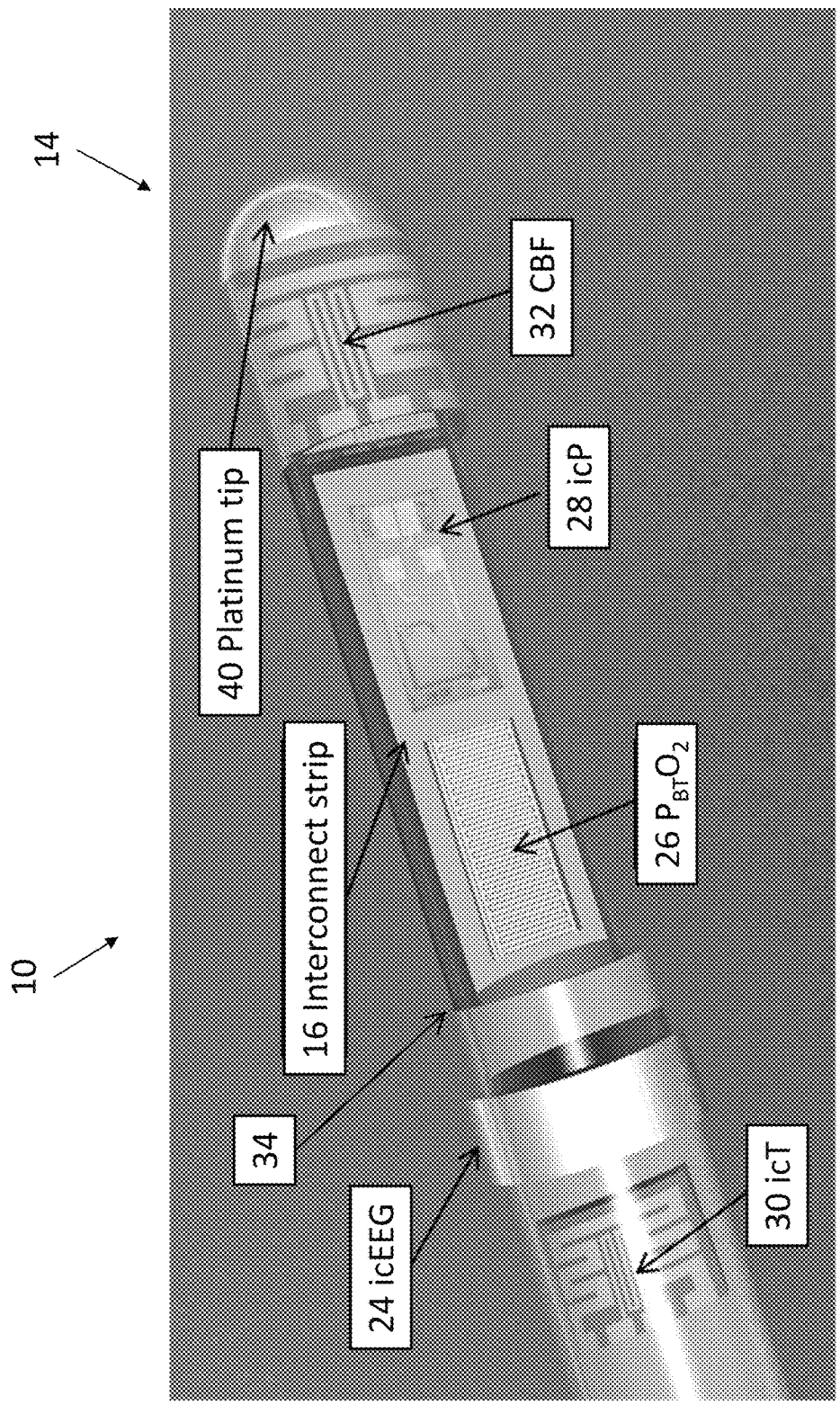
FIG. 3 is a perspective view of the distal end of another exemplary probe device with a cylindrical body having an intracranial EEG (ICEEG) platinum ring, a $P_{TB}O_2$ sensor, an intracranial pressure sensor, and a cranial blood flow heater/thermometer connected to a metal tip. The probe body is partially cut away to reveal the $P_{BT}O_2$ sensor and the pressure sensor encased in PDMS. The interconnect strip is constructed from Kapton.

Referring now to FIG. 1A through FIG. 1C, an exemplary probe device 10 is depicted. Device 10 comprises a probe body 34 having a proximal end 12 and a distal end 14. Probe body 34 can have any suitable cross-sectional shape, such as a semicircular cross-section (FIG. 1B) or a circular cross-section (FIG. 1C, FIG. 3). In some embodiments, Probe body 34 can have a hollow tubular shape, such as a catheter having a lumen running throughout (FIG. 2).

Probe body 34 comprises a layer of insulator 16 attached to an exterior surface (FIG. 1B, FIG. 2) or an interior layer (FIG. 1C, FIG. 3). Insulator 16 coats the several components of device 10, including connector pads 20, leads 18, and the various sensors. In various embodiments, device 10 can include one or more preamps 22, two or more EEG electrodes 24, one or more oxygen sensors 26, one or more pressure sensors 28, one or more flow sensor thermometers 30, and one or more flow sensor heaters 32.

The two or more EEG electrodes 24 can include any suitable EEG electrode. In one embodiment, the EEG electrodes 24 are thin film metal evaporated onto a flexible polymer strip. Non-limiting thin film metals include gold and platinum. In another embodiment, the EEG electrodes 24 at least partially span the girth of device 10. For example, as shown in FIG. 3, the EEG electrode 24 can be provided in the shape of a cuff encircling probe body 34 that is electrically connected to underlying leads within probe body 34.

The one or more pressure sensors 28 can be any suitable pressure sensor, such as microelectromechanical sensors (MEMS), capacitive pressure sensors, or piezoresistive pressure sensors. In one embodiment, the one or more pressure sensors 28 is an Amphenol P330 piezoresistive sensor, having good stability and a small size (about 330 microns in width and 900 microns in length). In one embodiment, the one or more pressure sensors 28 can detect a pressure range of between about 450 and 1050 mmHg, with sensitivities of 10 µV/V/mmHg with <1% nonlinearity.

The one or more flow sensor thermometers 30 and the one or more flow sensor heaters 32 work together to detect flow rate of fluid adjacent to the flow sensors by measuring the temperature change in the adjacent fluid as it passes from the one or more flow sensor heaters 32 to the one or more flow sensor thermometers 30. In certain embodiments, the one or more flow sensor thermometers 30 and the one or more flow sensor heaters 32 are configured to detect the flow rate of a fluid within a lumen of device 10, such as the embodiment depicted in FIG. 2.

In one embodiment, the one or more flow sensor heaters 32 is a thin film NiCr or Au resistor. In certain embodiments, the resistor can be on glass, such as a very thin glass on the order of about 100 microns. In other embodiments, the one or more flow sensor heaters 32 is a thin film NiCr or Au thermistor. In some embodiments, a NiCr or Au heater and a NiCr or Au resistor can be fabricated in close proximity to form a flow sensor heater 32. In certain embodiments, the one or more flow sensor thermometers 30 are silicon diodes. The one or more flow sensor thermometers 30 can be used alone as a temperature sensor. Therefore, in certain embodiments, device 10 can comprise a first flow sensor thermometer 30 for measuring temperature and a second flow sensor thermometer 30 for measuring fluid flow with a flow sensor heater 32.

Figure 4A:
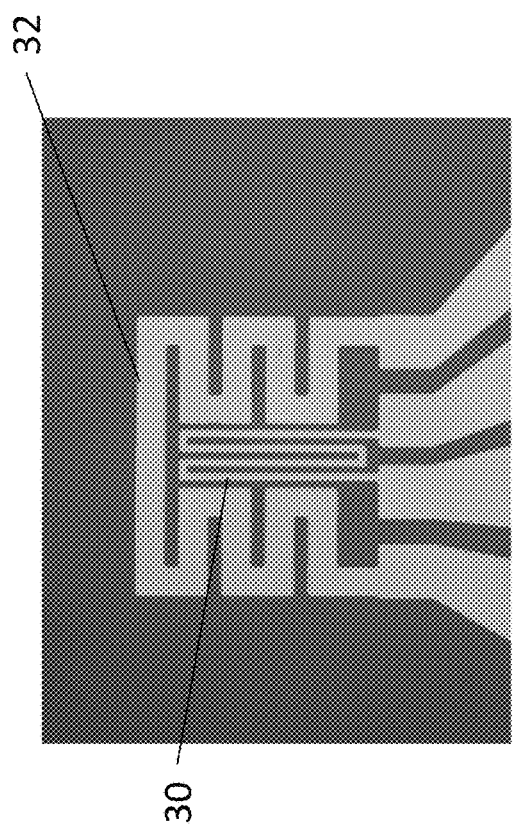
FIG. 4A, FIG. 4B, and FIG. 4C depict three exemplary designs for heater and thermistor flow sensors integrated on the same substrate, the inner circuit being the thermometer, the outer circuitry being the heater.
Figure 4C:
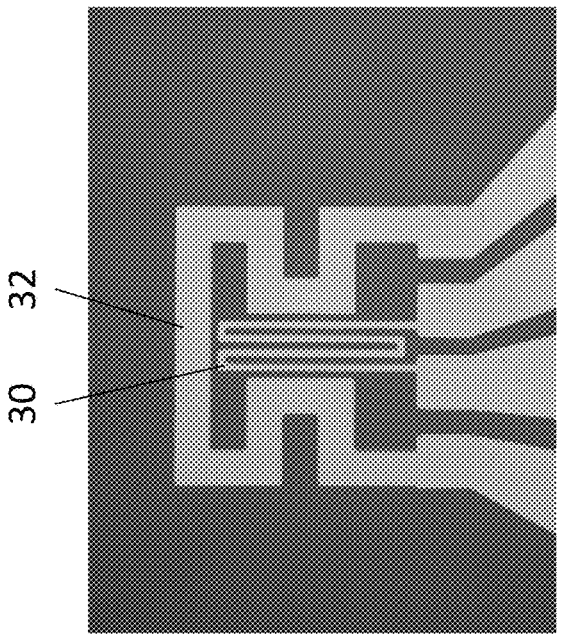
Figure 4B:
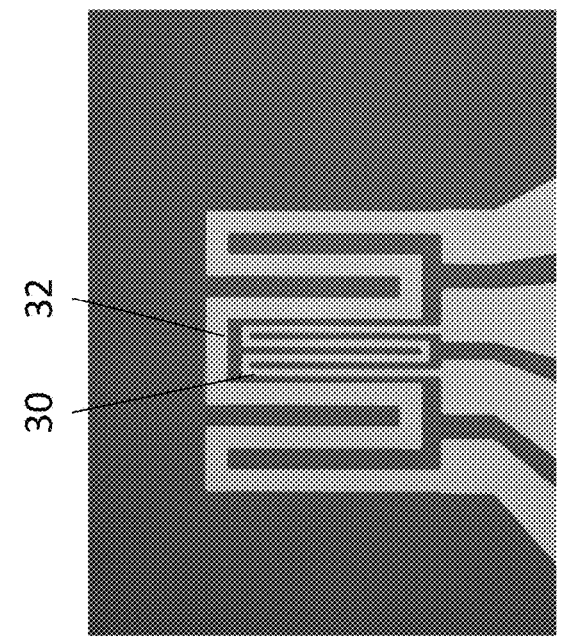
Figure 5:
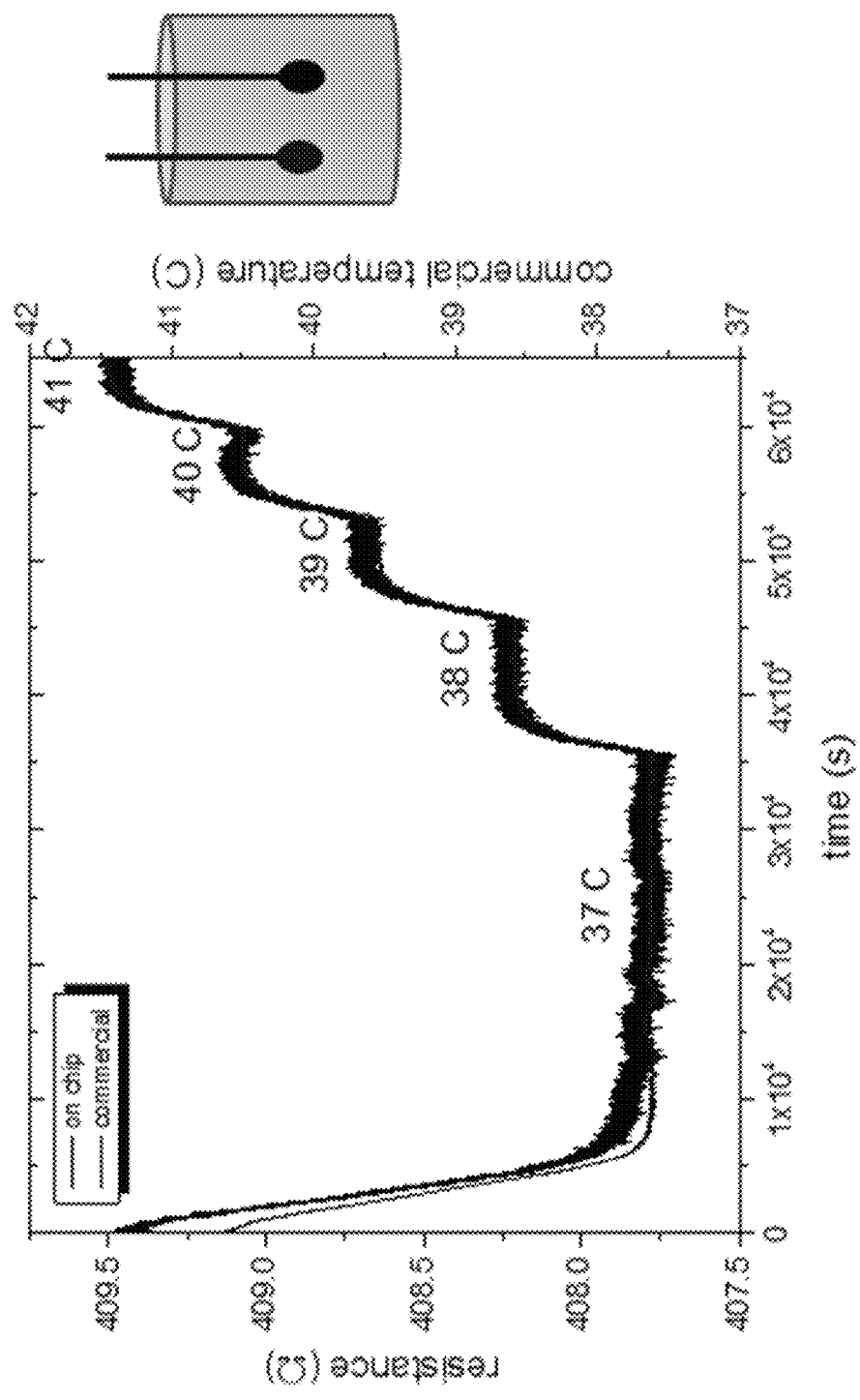
FIG. 5 is a chart comparing the performance of an exemplary integrated heater and thermistor flow sensor with a commercial temperature sensor over several different temperatures.
Figure 6:
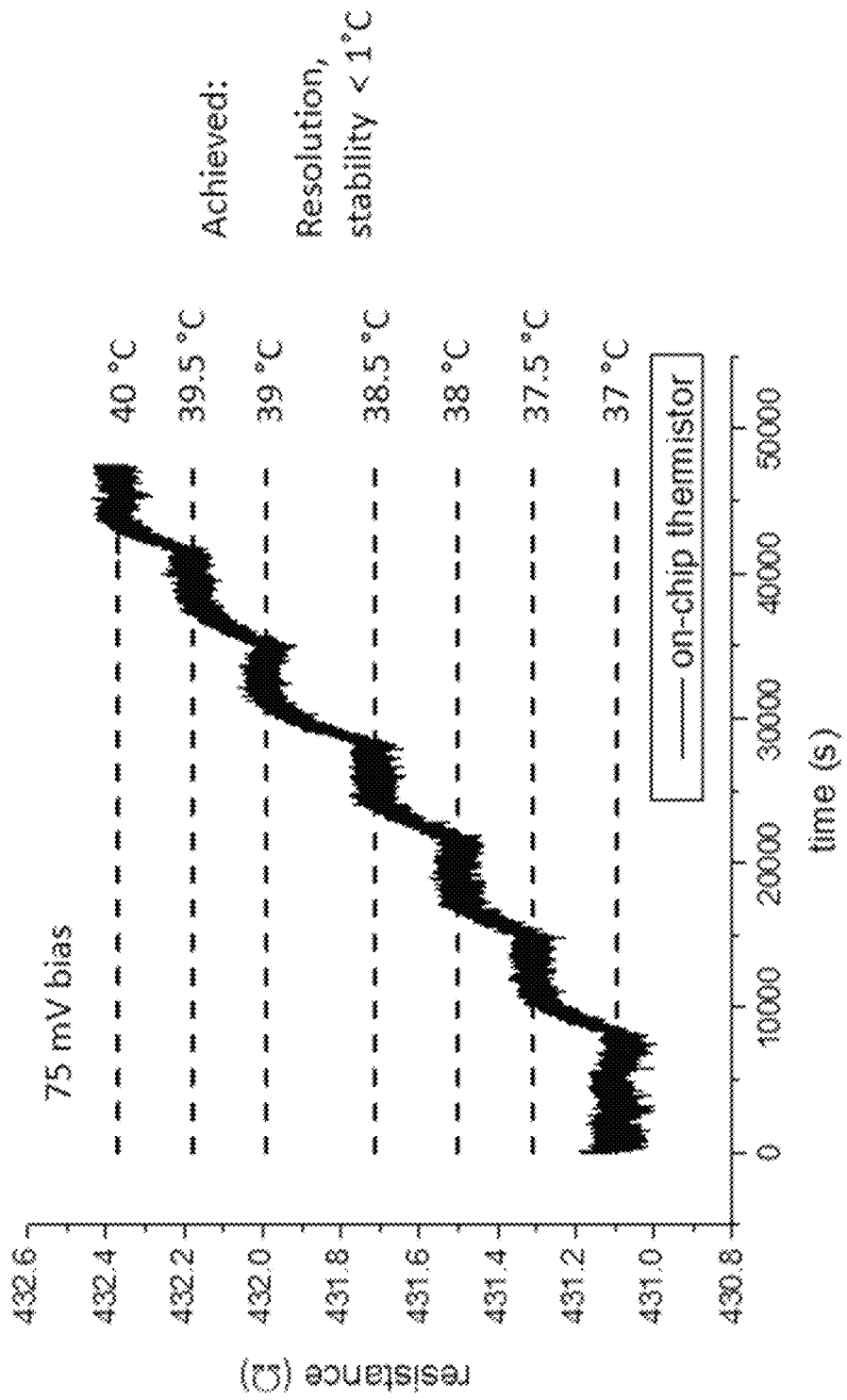
FIG. 6 is a chart demonstrating the resolution of an exemplary integrated heater and thermistor flow sensor over several different temperatures.
Figure 7:
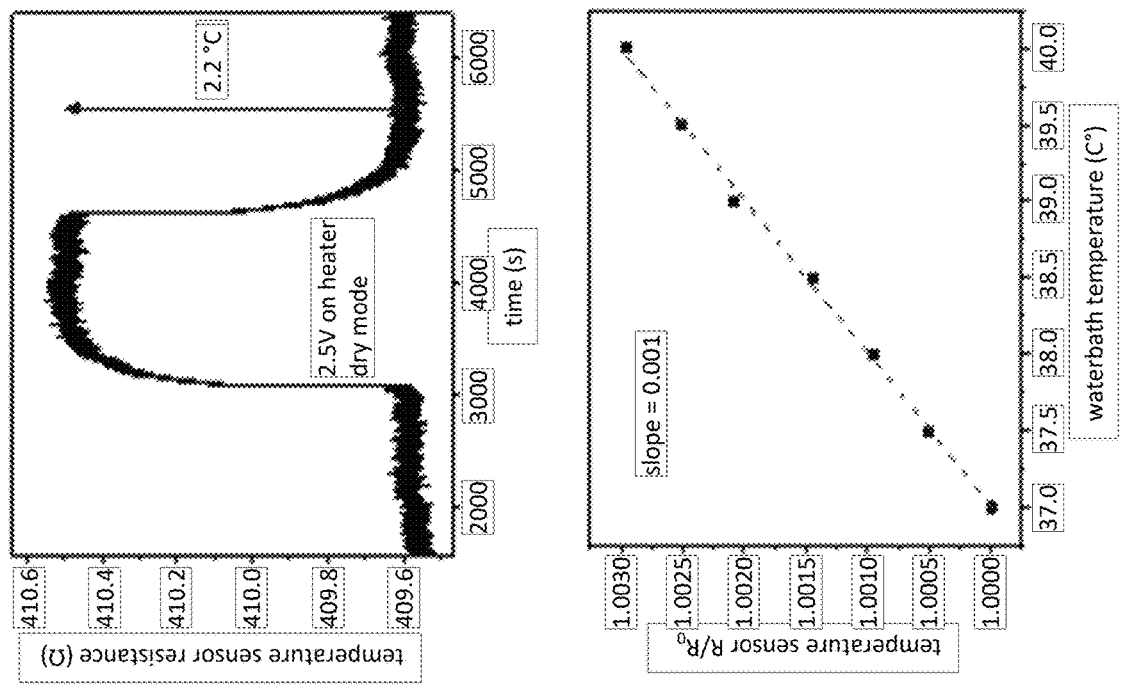
FIG. 7 depicts the exemplary design from FIG. 4A. The left image is an optical micrograph of a heater/thermistor pair in thin metal. The heater is the outside serpentine structure made from a 120 nm layer of platinum, giving ~200Ω. The thermistor is the inner serpentine constructed from platinum and having the same thickness, giving a resistance of ~400Ω. The right top graph shows the heating characteristics of the thin film heater, illustrating a fast response time and adequate delivered power. The right bottom graph shows the thermistor temperature characteristics. The resolution of the thermistor is ~0.1° C., much less than the required 1° C.
Figure 7:
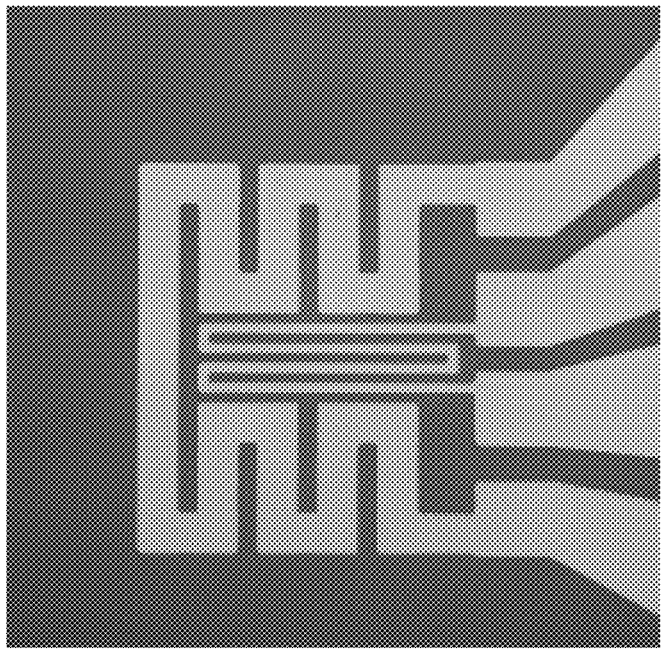

In certain embodiments, a flow sensor thermometer 30 and a flow sensor heater 32 can be integrated onto a single substrate (FIG. 4A, FIG. 4B, and FIG. 4C). An integrated flow sensor can be fabricated from platinum deposited on silicon or Kapton, wherein the flow sensor heater 32 forms an inner circuit and the flow sensor thermometer 30 forms an outer circuit around the flow sensor heater 32 inner circuit. In various embodiments, the flow sensor thermometer 30 and the flow sensor heater 32 can be connected to a conducting element 40, such as a platinum contact or tip (FIG. 3).

Figure 8:
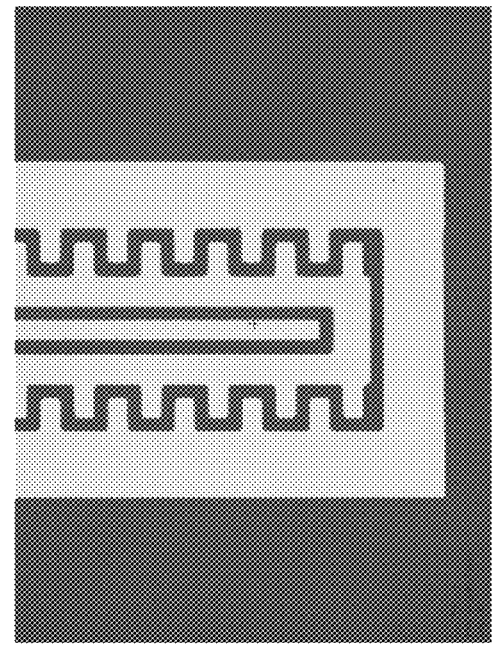
FIG. 8 is a series of graphs showing the performance of an exemplary oxygen sensor.
Figure 8:
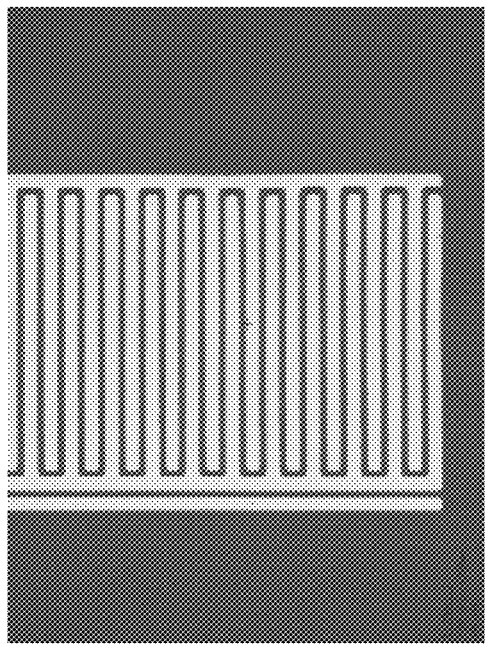
Figure 8:
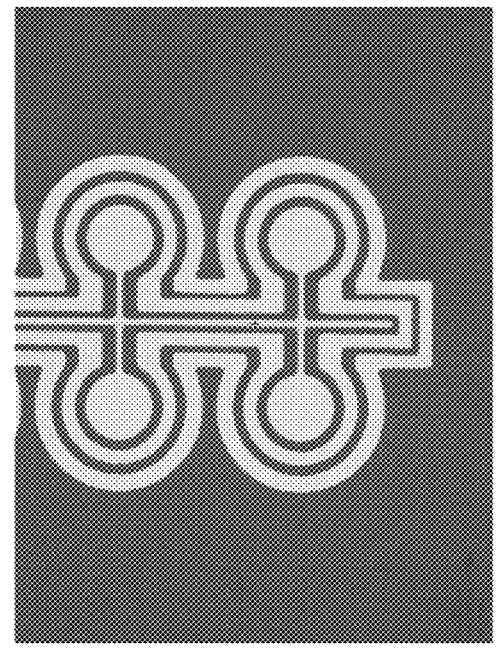
Figure 9:
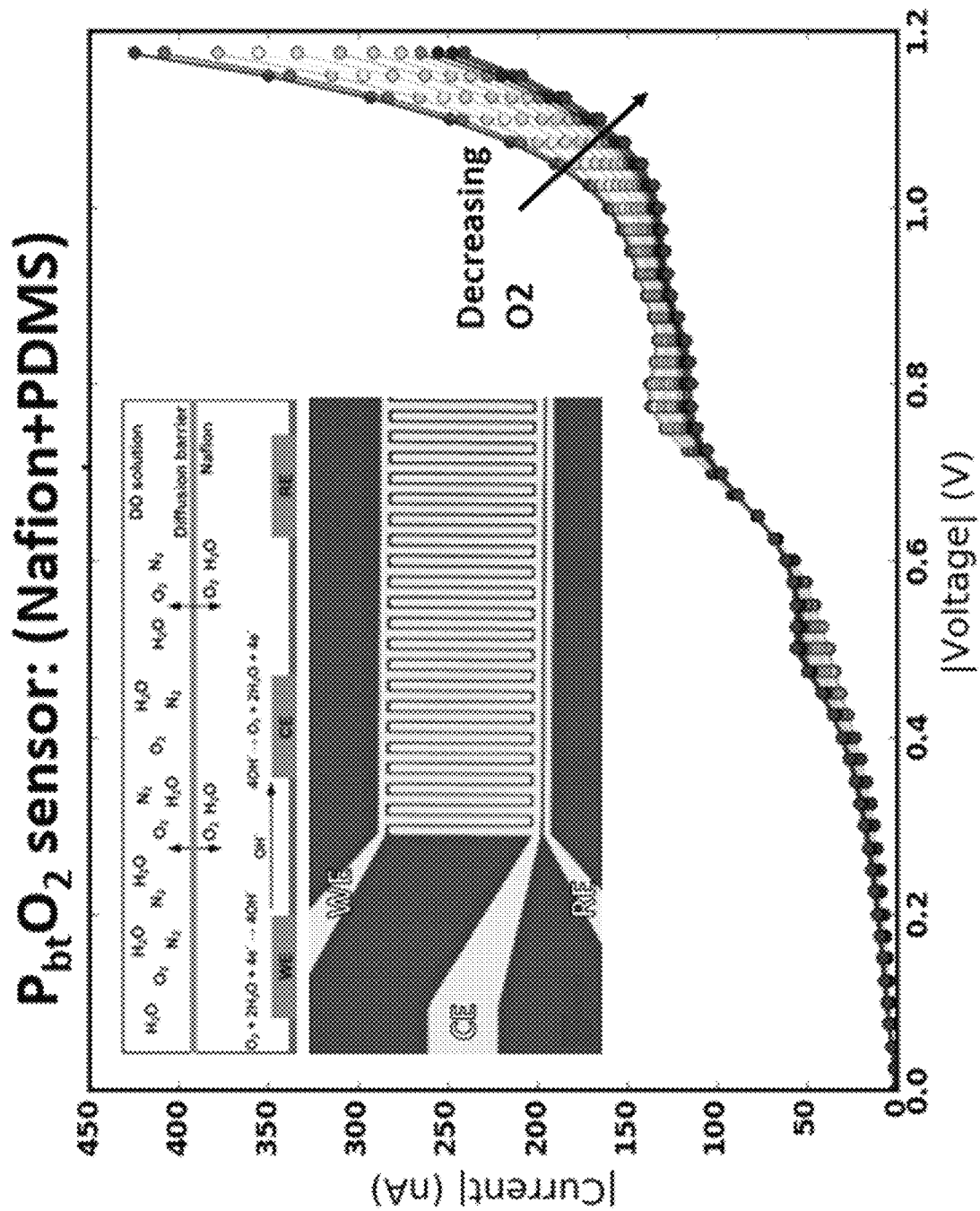
FIG. 9 is a graph showing the construction and performance of an exemplary oxygen sensor constructed from Nafion and PDMS.
Figure 10:
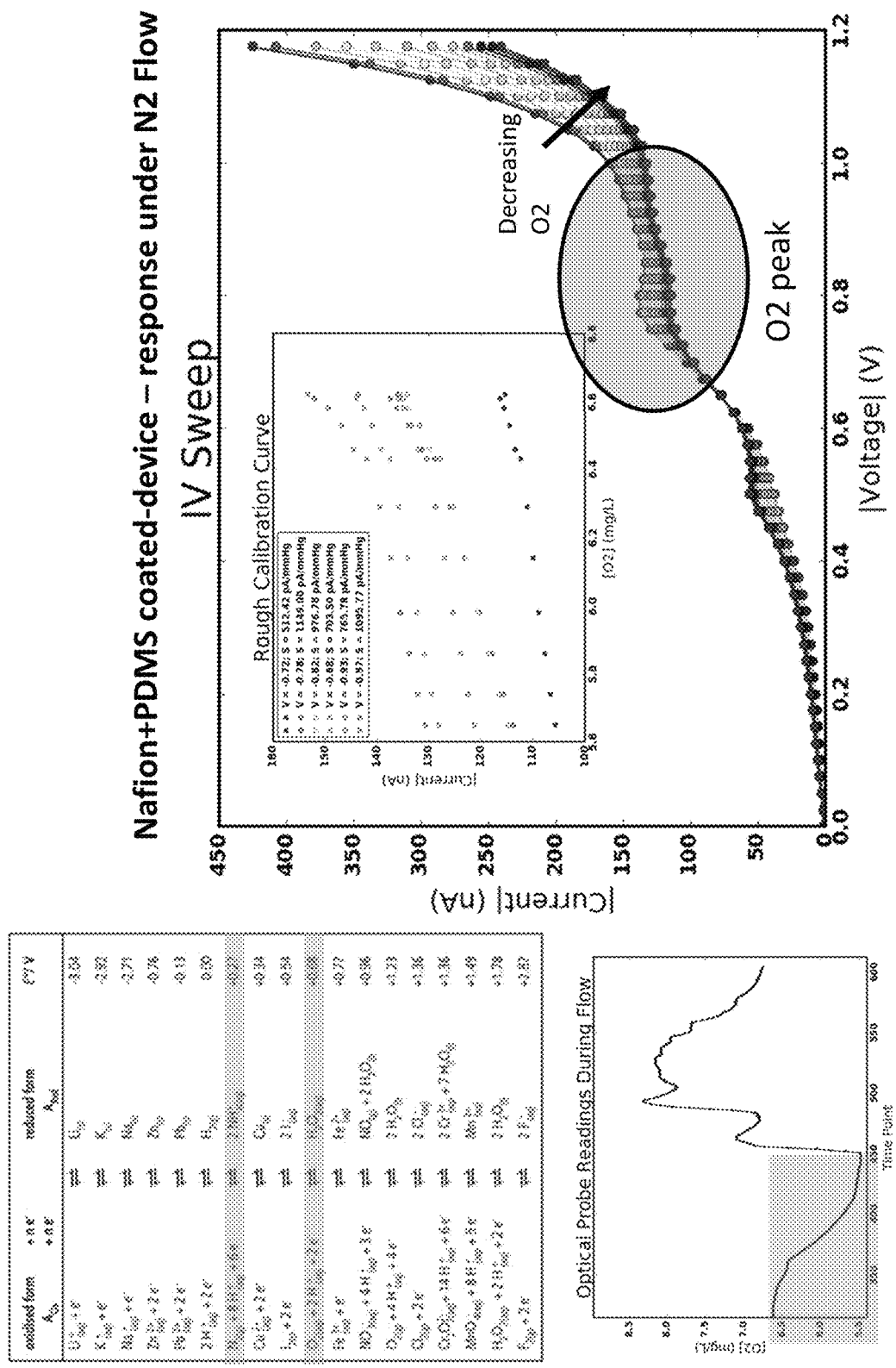
FIG. 10 is a graph showing reduced noise and reduced drift in an exemplary oxygen sensor by improving membrane stability and aging through the use of a thinner Nafion membrane, a Kapton substrate, and a longer burn-in time.
Figure 11:
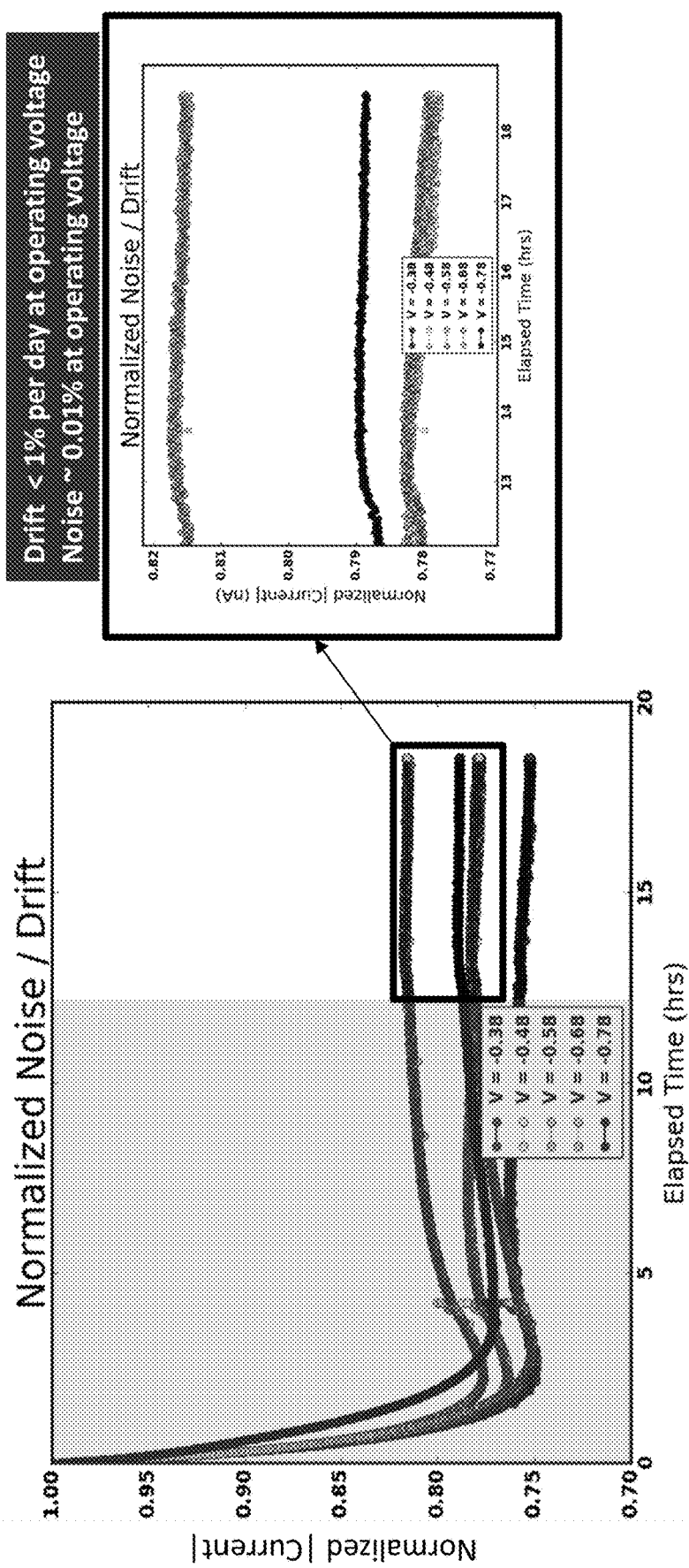
FIG. 11 is a graph and inset showing that noise and drift in an exemplary oxygen sensor stabilize at operating voltage.
Figure 12:
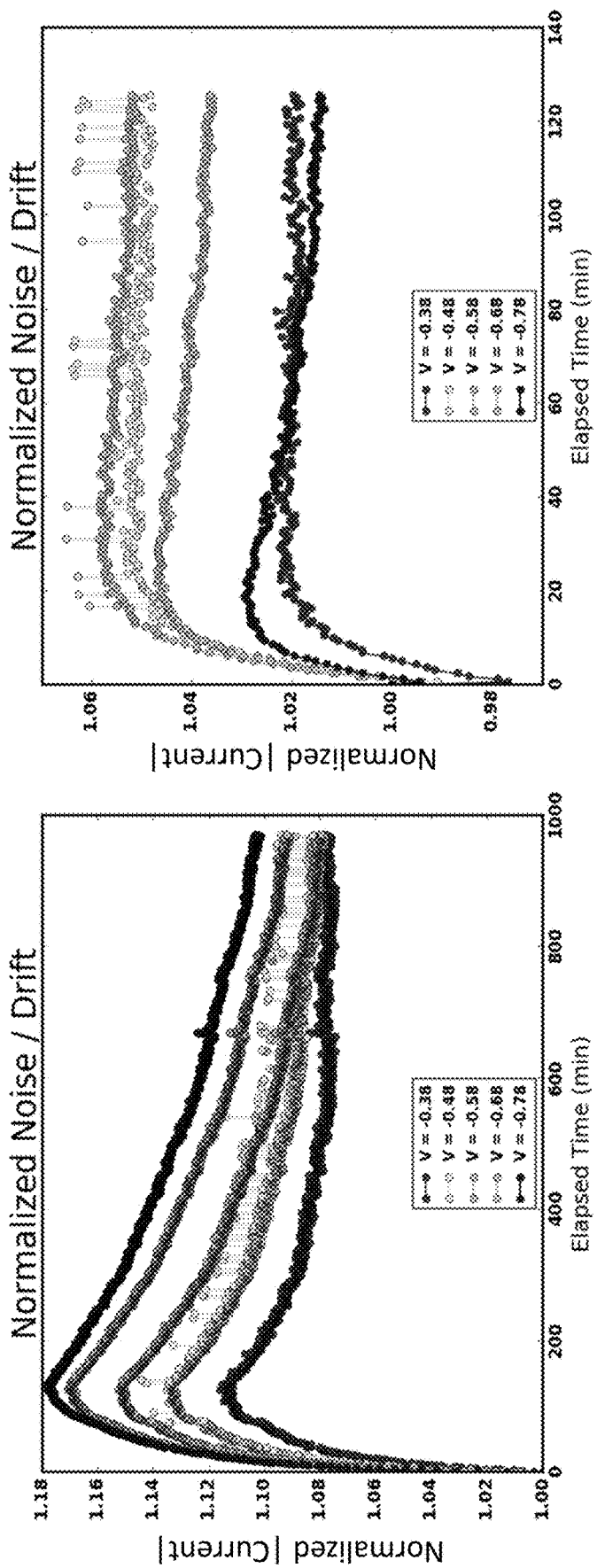
FIG. 12 depicts two graphs showing the effect of wetting on burn-in in an exemplary oxygen sensor. On the left, substantial drift occurs after stopping the voltage and drying the oxygen sensor for 35 minutes, then re-submerging in water. On the right, a reduction in drift occurs after stopping voltage for 40 minutes in a continuously submerged oxygen sensor in water.

The one or more oxygen sensors 26 can be any suitable oxygen sensor, including a Clark-type sensor or a sensor comprising a thin-film electrode leads overlaid with a solid-state proton conductive matrix (PCM) and operated in CV mode. In one embodiment, the one or more oxygen sensors 26 can be fabricated using titanium/gold or titanium/platinum electrodes or wafers having a PCM constructed from Nafion, an oxygen-permeable membrane (FIG. 8). In some embodiments, the PCM can be coated or overlaid with a protective layer, such as polydimethylsiloxane (PDMS) to increase membrane stability. In some embodiments, the performance of the fabricated oxygen sensors 26 can be improved with the use of polyvinylpyrollidone (PVP) as an adhesion promoting compound. In some embodiments, the performance of the fabricated oxygen sensors 26 can be improved with the use of Kapton as the substrate.

The various sensors described herein are each connected and powered through leads 18, wherein each lead 18 connects an individual sensor to an individual connector pad 20. In some embodiments, two or more leads 18 can be used to connect a sensor with a connector pad, such that individual leads 18 can be dedicated as a source lead, a drain lead, a power lead, a ground lead, or a backup lead for redundancy. In some embodiments, each of the connector pads 20 is capable of connecting to a headstage amplifier to amplify the signals obtained by each of the various sensors. In some embodiments, one or more preamps 22 can be provided to further boost the signals of the various sensors, or to boost the signals of the various sensors without the use of a headstage amplifier. Power may be provided to the sensors and amplifiers from an external power supply connected to connector pad 20 through wired or wireless means. The power supply may be a battery or other device capable of providing a DC voltage with sufficient current to power all of the sensors, amplifiers, and other devices included in the system. In some embodiments, power and communications are provided from a single connector, for example a Universal Serial Bus (USB) cable.

The various sensors can be positioned at any point on device 10 in any order, preferably positioned towards distal end 14 to enhance the range of the various sensors. In one embodiment, the positioning of the various sensors is as depicted in FIG. 1A, such that flow sensor heater 32 is most distal, followed by flow sensor thermometer 30, pressure sensor 28, oxygen sensor 26, and EEG electrodes 24. In certain embodiments, the various sensors are positioned at a distance relative from each other. For example, in one embodiment, flow sensor thermometer 30 is positioned between about 0.5 and 5 mm distal to pressure sensor 28. In one embodiment, flow sensor heater 32 is positioned 10 mm to 30 mm distal to oxygen sensor 26. In one embodiment, flow sensor heater 32 is positioned 20 mm to 60 mm distal to EEG electrodes 24.

Device 10 can further include any additional sensor. For example, in FIG. 2, device 10 can further include one or more local field potential electrodes 36. Device 10 can further include one or more combination electrode sensor 38, such as the integrated flow sensor described above, or a combination biochemical and temperature sensor. Device 10 can further include one or more sensors for detecting one or more biomarkers, such as field effect transistors (FET), enzyme field effect transistors (ENFET), CMOS-compatible Si nanowire field-effect transistors (NWFETs) and other ultrasensitive electronic biosensors (Stern E et al., Nature, 2007, 445(7127):519-22). CMOS-compatible processes offer the advantage to fabricate monolithically integrated NWFET arrays, in which highly uniform and reproducible sensors can be produced in a predetermined fashion and electrically addressed individually. Such NWFET arrays open up possibilities to locally detect electrical and chemical signals and observe their time development and spatial distributions. The sensors can be configured to detect any desired biological parameter of interest, such as lactate, pyruvate, glutamate, and glycerol.

Device 10 can further include a valve and a valve control (not pictured). For example, in some embodiments wherein device 10 has a hollow tubular shape, such as in a catheter with a lumen, the valve can be positioned within the lumen to control the flow of fluids through the lumen. The valve control can be electronically linked to the valve and to any of the several sensors of device 10. In some embodiments, the valve control is electronically linked to pressure sensor 28, such that the valve control is configured to open the valve when pressure sensor 28 detects a pressure above a certain level, and is configured to close the valve when pressure sensor 28 detects a pressure below a certain level. In this embodiment, device 10 can be implanted into a patient such that pressure sensor 28 and a proximal end of device 10 are positioned within the patient's intracranial space, and a distal end of device 10 is positioned in a location suitable for drainage. Device 10 can thereby reduce or prevent intracranial hypertension by opening the valve and releasing fluid from, e.g., a brain ventricle if a pressure sensor 28 detects an intracranial pressure that is above a preset threshold level, and closing the valve once a pressure sensor 28 detects an intracranial pressure that has fallen below a preset threshold level.

As described elsewhere herein, the several components of device 10, including connector pads 20, leads 18, and the various sensors, are affixed to probe body 34 by insulator 16. Insulator 16 can be any suitable insulating material, such as a polyimide, or Kapton. In various embodiments, probe body 34 and insulator 16 comprise a biologically compatible or a biologically inert material. In other embodiments, probe body 34 and insulator 16 can be coated with a biologically compatible material or a biologically inert material, such as polytetrafluoroethelene (PTFE) or PDMS. In various embodiments, probe body 34 and insulator 16 are flexible. In some embodiments, probe body 34 and insulator 16 can be molded into one piece. In other embodiments, probe body 34 and insulator 16 are bonded or adhered together, such as with silicone. Probe body 34 can have any suitable shape, such as a semi-circular cross-section, a circular cross-section, a square cross-section, a rectangular cross-section, and the like. In various embodiments, probe body 34 can have a diameter between about 0.5 mm and 1.5 mm. In certain embodiments, several probe bodies 34 can be arranged in a 3D array similar to the Utah electrode array.

The various sensors described herein may return measurements to a interface device as analog voltage levels, digital signals, or both. As described herein, "interface device" refers to any device capable of receiving analog or digital signals and performing at least one of: storing the data on a non-transitory computer-readable medium, or transmitting the data via a wired or wireless communication link to a remote computing device. In some embodiments, the interface device may further include non-transitory computer-readable media having calibration data for the various sensors of the probe device. In some embodiments, the interface device may further comprise a processor and stored instructions for performing analysis or display of the data collected. In some embodiments, the interface device further comprises a graphical user interface (GUI) and a display capable of presenting some or all of the data, or calculated derivatives thereof, in human readable form. The data collected may be presented as a time series graph, real-time display of current values, minimum or maximum values, or any other display format known in the art. In some embodiments, the interface device can connect to one or more external displays in a wired or wireless connection. In some embodiments, the interface device can be incorporated into a computing device, including but not limited to desktop or mobile devices, laptops, desktops, tablets, smartphones or other wireless digital/cellular phones, televisions or other thin client devices as would be understood by those skilled in the art.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art may, using the preceding description and the following illustrative examples, utilize the present invention and practice the claimed methods. The following working examples therefore, specifically point out exemplary embodiments of the present invention, and are not to be construed as limiting in any way the remainder of the disclosure.

Example 1: Swine Model Evaluation

The swine brain has many similarities to that of the human which make it the preferred model for testing the novel probe device. It has a gyrencephalic cortical structure, with a growth and development and glial to neuron ratio, myelin levels, and water content similar to the human brain (Thibault K L et al., Journal of biomechanics 31.12 (1998): 1119-1126). Further, unlike rodents (who recover in their cages without much support), swine need to be observed in an intensive care environment after TBI like in humans. Testing will be performed on male Yorkshire pigs weighing 20-25 Kg. The pigs are housed in an animal care facility for at least 4 days before any experimental procedure and allowed free access to food and water until 12 hr before an experiment.

The testing is performed in two phases. In the first phase, non-traumatized animals are studied to test the functioning of the novel probe device in comparison to standard monitoring devices under controlled physiological conditions. In the second phase, the probe is tested in brains subjected to controlled cortical trauma.

For the first phase, four swine are used. The Yorkshire pigs are induced with Telazol+ketamine+dexmedetomidine to allow endotracheal intubation and maintained on a gas anesthetic (Isoflurane or Sevoflurane) and maintained on a pressure controlled ventilator (GE Aespire View). Preoperative and postoperative doses of buprenorphine provide opioid analgesia. The head of the animal is placed in a pig stereotaxic frame (David Kopf Instruments, Tujunga, CA). A burr hole sufficient to accommodate a multi lumen bolt is made and the bolt attached. The location of the burr hole is over the frontal lobe (Manley G T et al., Journal of neurotrauma 23.2 (2006): 128-139) in 2 animals and over the parietal lobe (Meissner A et al., European Surgical Research 47.3 (2011): 141-153) in the other 2 animals. This variation allows for the comparison of probe functions over two locations and also determines the best location for the CCI studies in the second phase. Once the bolt has been put in place, the probe device is inserted through one lumen of the multi lumen bolt with the other lumens being used for measurement of intracranial pressure (icP), cerebral blood flow (CBF), intracranial temperature (icT), intracranial oxygen (icO), and electroencephalogram (EEG) using commercially available devices. The probes are inserted 15 mm into the brain parenchyma. The connector lead is tunneled subcutaneously to allow exit and access for data acquisition through the skin on the dorsal surface of the neck. Thorough aseptic techniques are used for all aspects of the procedure and the skin is sutured closed in two layers.

During an initial one-hour period, baseline measurements are registered through the novel probe device and the commercial devices implanted. Subsequently, the following physiological manipulations are performed while the pigs are still under anesthesia—change in the $O_2$ concentrations (range of 20%-100% $O_2$) in inhaled gas, core body temperature lowered and raised (range 37.2-39.2° C.) for brief periods through a cooling and heating blanket. The EEG functional capabilities are tested at various depths of anesthesia by adjusting the percentage of inspired anesthetic gas (isoflurane minimal alveolar concentration (MAC) ranging from (0.75-2.5)). Further testing includes monitoring subtle changes in CBF and icP after switching to Sevoflurane gas anesthetic from the standard Isoflurane gas. The phase one pigs are recovered from anesthesia and monitored for a period of 72 hours or more for any complications that may arise and allow collection of data in a fully conscious animal. These physiological manipulations and baseline recordings allow the comparison of the functioning of the novel probe device relative to the commercial probes. Measures obtained using the novel probe device of ICP, brain tissue oxygen, brain temperature and cerebral blood flow are expected to have less than 5% variation from commercial probe measures.

In the second phase, 3 swine are used. The swine are placed in the stereotaxic frame and probes placed in either the parietal lobe location or frontal lobe. A 20 mm burr hole is made in the calvarium so as not to damage the dura. A controlled cortical impact (CCI) lesion is created in this location using a controlled cortical impact device. The parameters in Manley et al. (2006) are used so as to be able to compare findings and other swine CCI studies. Using a 15 mm impactor tip with a beveled edge (to prevent/reduce tearing of the dura on impact), the dura is struck at a velocity of 3.5 m/sec with a dwell time of 400 msec and a depth of depression of 12 mm. These parameters have been shown to produce a consistent focal injury. The animals are monitored under anesthesia for 3 hr while recording measurements of the physiological parameters stated above. The pigs are then recovered from anesthesia and monitored for a period of 72 hours or more for any complications that may arise and to allow collection of data in a fully conscious animal. In the event of animal distress, or otherwise at the end of the monitoring period, the pigs are sacrificed by intracardiac perfusion, followed by brain fixation with buffered solution of 4% paraformaldehyde and picric acid, post-fixed in situ to prevent handling artifacts, and finally harvesting of the brains with pathology examined as described in de Lanerolle et al. (Journal of Neuropathology & Experimental Neurology 70.11 (2011): 1046-1057).

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. An integrated probe device comprising:
   an elongate body having:
      a proximal end comprising a plurality of connector pads, and
      a distal end having a tip, the distal end comprising:
         at least one EEG electrode,
         at least one oxygen sensor,
         at least one pressure sensor,
         at least one thermally conductive element, and
         at least one flow sensor comprising:
            a heater and thermistor paired in thin metal, wherein the thermistor comprises a serpentine structure, wherein the heater comprises a first outer serpentine structure and a second outer serpentine structure with the first and second outer serpentine structures disposed on opposing sides of the thermistor serpentine structure, wherein the thermistor is separate from leads connecting each other sensor to the plurality of connector pads, wherein each of the sensors is connected to the plurality of connector pads by one or more leads, wherein the at least one thermally conductive element is connected to the at least one flow sensor, and wherein the at least one flow sensor is proximally adjacent to the tip of the distal end.

2. The device of claim 1, wherein the at least one EEG electrode comprises a thin film metal evaporated onto a flexible polymer strip.

3. The device of claim 1, wherein the at least one oxygen sensor is a Clark-type sensor comprising thin-film electrode leads overlaid with a solid-state proton conductive matrix (PCM).

4. The device of claim 3, wherein a layer of polydimethylsiloxane (PDMS) overlays the PCM.

5. The device of claim 1, wherein the at least one oxygen sensor comprises a titanium/gold or titanium/platinum electrodes overlaid with a PCM constructed from 1,1,2,2-tetrafluoroethene; 1,1,2,2-tetrafluoro-2-[1,1,1,2,3,3-hexafluoro-3-(1,2,2-trifluoroethenoxy)propan-2-yl]oxyethanesulfonic acid.

6. The device of claim 1, wherein the at least one pressure sensor is selected from a microelectromechanical sensor (MEMS), a capacitive pressure sensor, or a piezoresistive pressure sensor.

7. The device of claim 1, wherein the at least one pressure sensor is electronically connected to a valve positioned within a lumen of the elongate body, such that the at least one pressure sensor is configured to open the valve above a preset pressure threshold and to close the valve below a preset pressure threshold.

8. The device of claim 1, wherein the at least one flow sensor heater and the at least one flow sensor thermometer each comprises a thin film NiCr or Au resistor.

9. The device of claim 1, wherein the at least one flow sensor thermometer is a silicon diode.

10. The device of claim 1, wherein the at least one flow sensor comprises a heater adjacent to a thermistor fabricated as a single component.

11. The device of claim 1, wherein the at least one flow sensor heater and the at least one flow sensor thermometer are integrated onto a single substrate.

12. The device of claim 1, further comprising one or more preamps positioned on the one or more leads between the connector pads and the sensors.

13. The device of claim 1, further comprising at least one local field potential electrode.

14. The device of claim 1, further comprising at least one field effect transistor (FET) sensor, enzyme FET (ENFET) sensor, or nanowire field-effect transistors (NWFET).

15. The device of claim 14, wherein the at least one FET sensor, ENFET sensor, or NWFET sensor is configured to detect a biomarker selected from the group consisting of: lactate, pyruvate, glutamate, glutamine, and glycerol.

16. The device of claim 1, wherein the elongate body is coated in a layer of polytetrafluoroethelene (PTFE) or polydimethylsiloxane (PDMS).

17. The device of claim 1, further comprising an interface device electronically connected to the plurality of connector pads, the interface device comprising non-transitory computer-readable media configured to capture readings from the device sensors and a processor configured to interpret readings from the device sensors.

18. The device of claim 17, wherein the interface device further comprises non-transitory computer-readable media having calibration data for the device sensors.

19. The device of claim 17, wherein the interface device is configured to connect to one or more external displays in a wired or wireless connection.

20. The integrated probe device of claim 1, wherein the tip is conductive, wherein the at least one flow sensor is connected to the conductive tip.

21. The integrated probe device of claim 1, wherein the at least one EEG electrode comprises a cuff attached to an exterior of the probe device.

22. A probe device comprising:
   an elongate hollow tubular probe body configured to drain a fluid, the body comprising:
      a drain lumen,
      at least one valve electronically linked to at least one valve control,
      at least one EEG electrode,
      at least one oxygen sensor,
      at least one pressure sensor, and
      at least one flow sensor comprising:
         a heater and thermistor paired in thin metal, wherein the thermistor comprises a serpentine structure, wherein the heater comprises a first outer serpentine structure and a second outer serpentine structure with the first and second outer serpentine structures disposed on opposing sides of the thermistor serpentine structure, at least one thermally conductive element, and a proximal end comprising a plurality of connector pads, wherein each of the sensors is connected to the plurality of connector pads by one or more leads and the thermistor is separate from the leads, wherein the at least one thermally conductive element is connected to the at least one flow sensor, wherein the at least one flow sensor is proximally adjacent to a tip at a distal end of the probe body, and wherein the valve control is electronically linked to one or more of the at least one pressure sensor, the at least one oxygen sensor, and the at least one flow sensor.

23. An integrated probe device comprising:
an elongate body having:
- a proximal end comprising one or more connector pads, and
- a distal end having a conducting distal tip, the distal end comprising:
  - at least one EEG electrode,
  - at least one oxygen sensor,
  - at least one pressure sensor,
  - at least one thermally conductive element, and
  - at least one flow sensor comprising:
    - a heater and thermistor paired in thin metal:
      - wherein the thermistor comprises a top side, a bottom side, and first and second lateral sides, wherein the first and second lateral sides are across from one another;
      - wherein the heater comprises first and second outer serpentine structures, wherein the first and second outer serpentine structures each comprise at least two 180 degree turns, wherein the first and second outer serpentine structures are positioned adjacent to the first and second lateral sides of the thermistor, respectively;
      - wherein the thermistor is separate from leads connecting each other sensor to the one or more connector pads and forms an inner serpentine structure, wherein each of the sensors is connected to a connector pad by one or more leads, wherein the at least one thermally conductive element is connected to the at least one flow sensor, and wherein the at least one flow sensor is proximally adjacent to the conducting distal tip.

24. The integrated probe device of claim 23, wherein each of the 180 degree turns of the first and second outer serpentine structures comprise vertical turns to create rungs that run parallel to the first and second lateral sides of the thermistor.

25. The integrated probe device of claim 23, wherein each of the 180 degree turns of the first and second outer serpentine structures comprise horizontal turns to create rungs that run perpendicular to the first and second lateral sides of the thermistor.

* * * * *